(12) United States Patent
Retzlaff et al.

(10) Patent No.: US 10,130,041 B2
(45) Date of Patent: Nov. 20, 2018

(54) BALER WITH AUTOMATED EJECTION OF BALES

(71) Applicant: AGCO Corporation, Hesston, KS (US)

(72) Inventors: Lawrence D. Retzlaff, Hesston, KS (US); Robert J. Waggoner, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 74 days.

(21) Appl. No.: 15/505,153

(22) PCT Filed: Sep. 3, 2015

(86) PCT No.: PCT/US2015/048228
§ 371 (c)(1),
(2) Date: Feb. 20, 2017

(87) PCT Pub. No.: WO2016/036905
PCT Pub. Date: Mar. 10, 2016

(65) Prior Publication Data
US 2017/0273248 A1  Sep. 28, 2017

Related U.S. Application Data

(60) Provisional application No. 62/045,291, filed on Sep. 3, 2014.

(51) Int. Cl.
*A01F 15/04* (2006.01)
*A01F 15/14* (2006.01)
(Continued)

(52) U.S. Cl.
CPC .......... *A01F 15/0875* (2013.01); *A01F 15/14* (2013.01); *B30B 9/3007* (2013.01); *B30B 9/3014* (2013.01); *A01F 15/04* (2013.01)

(58) Field of Classification Search
CPC ...... A01F 15/0875; A01F 15/14; A01F 15/04; A01F 15/08; B30B 9/3007; B30B 9/3014
(Continued)

(56) References Cited

U.S. PATENT DOCUMENTS 4,791,865 A * 12/1988 Naaktgeboren ..... A01F 15/0825
100/188 R
5,540,144 A * 7/1996 Schrag ................ A01F 15/0875
100/188 R
(Continued)

FOREIGN PATENT DOCUMENTS

| KR | 101425869 B1 | 8/2014 |
|---|---|---|
| WO | 2012/160140 A1 | 11/2012 |
| WO | 2014/149090 A2 | 9/2014 |

OTHER PUBLICATIONS

European Patent Office, International Search Report for parent PCT Application No. PCT/US2015/048228, dated Nov. 10, 2015.
(Continued)

*Primary Examiner* — Jimmy T Nguyen

(57) ABSTRACT

A system for ejecting a bale from a baler, wherein the ejection process is controlled by a control unit with input from various sensors and from a remote operator located on a tractor. The control unit automatically positions a chute, controls a power take-off from the tractor, depressurizes and opens a chamber door, ties the bale, selects and causes ejector teeth to project into a forming chamber to engage the bale, causes the ejector teeth to move toward a discharge outlet such that the engaged bale moves with them toward and through the discharge outlet, and determines when the bale has fully ejected from the baler. The remote operator may choose to eject only the bale or to eject the entire contents of the forming chamber, and if the former, the control unit determines the bale's length and selects a subset of the ejector teeth that corresponds to that length.

20 Claims, 6 Drawing Sheets

(51) Int. Cl.
*A01F 15/08* (2006.01)
*B30B 9/30* (2006.01)

(58) Field of Classification Search
USPC .......................................... 100/7, 179, 188 R
See application file for complete search history.

(56) References Cited

U.S. PATENT DOCUMENTS

| | | | |
|---|---|---|---|
| 5,941,169 A | 8/1999 | Brown et al. | |
| 7,093,537 B2 * | 8/2006 | Dubois | A01F 15/0875 |
| | | | 100/188 R |
| 7,779,755 B2 * | 8/2010 | De Rycke | A01F 15/0875 |
| | | | 100/188 R |
| 2013/0014655 A1 | 1/2013 | Dumarey et al. | |
| 2013/0019765 A1 | 1/2013 | Demon | |
| 2013/0233187 A1 * | 9/2013 | De Rycke | A01F 15/0875 |
| | | | 100/188 R |
| 2014/0216279 A1 * | 8/2014 | Van Groenigen | A01F 15/0875 |
| | | | 100/4 |

OTHER PUBLICATIONS

UK Intellectual Property Office, International Search Report for sister UK Application No. GB1417681.2, transmittal dated Mar. 27, 2015.

* cited by examiner

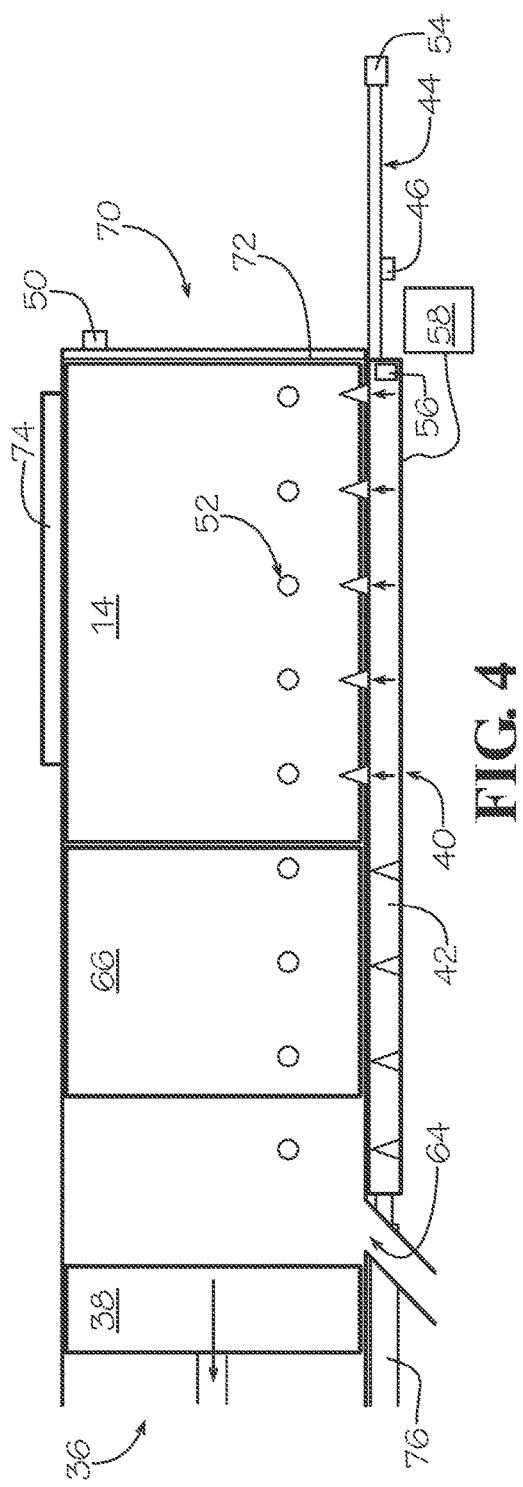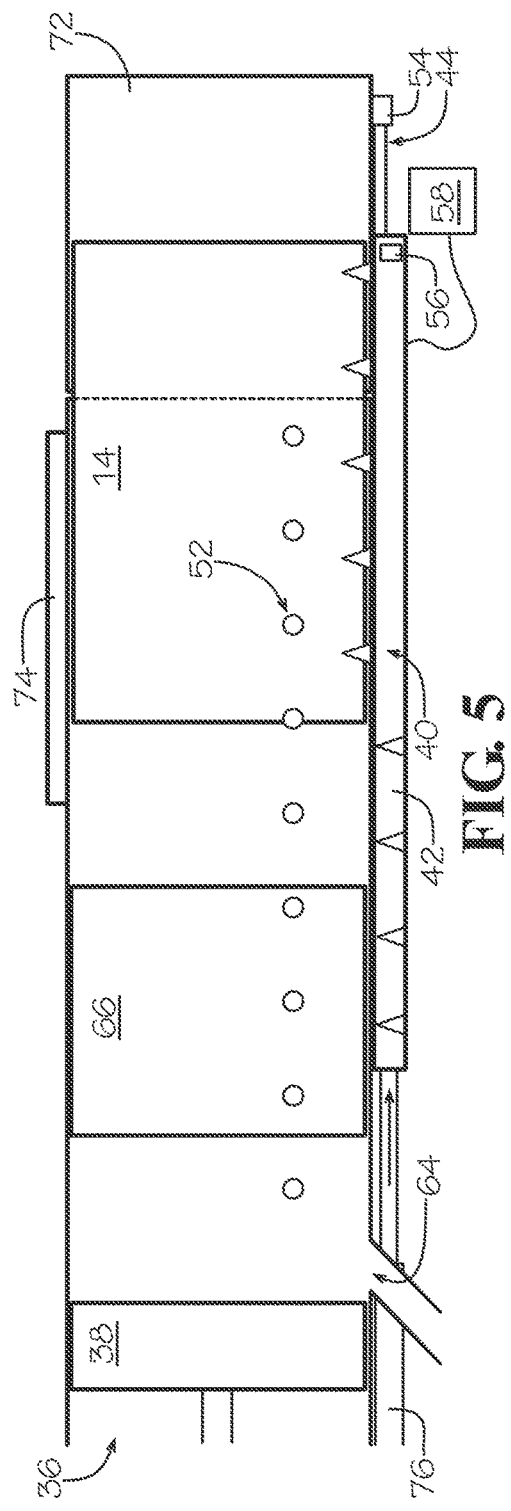

BALER WITH AUTOMATED EJECTION OF BALES

CROSS REFERENCE TO RELATED APPLICATION

This application claims the benefit of U.S. Provisional Application No. 62/045,291, filed Sep. 3, 2014, which is hereby incorporated by reference in its entirety.

FIELD

The present invention relates to systems and methods for controlling the operation of balers.

BACKGROUND

Large square balers are used in the agricultural industry to create large substantially rectangular bales of crop material by moving over crop windrows to collect loose crop material, compress it, and form it into bales that are then tied and ejected. To that end, a baler is typically mechanically coupled with a tractor, and a power take-off (PTO) mechanism transfers power from the tractor's engine to drive the baler's operation. A rotary pick-up at the front of the baler picks up the loose crop material and moves it into a stuffer chamber. Once the stuffer chamber is full, its contents are moved through a stuffer chute into a forming chamber. A reciprocating plunger compresses the crop material in the forming chamber into a growing bale. Once the bale reaches a predetermined length, which could be eight feet, it is tied and ejected through a discharge outlet to fall onto the ground behind the baler. The process then continues to create the next bale.

In some balers, the forming chamber may contain both a finished bale awaiting ejection and an unfinished bale growing adjacent to it. The growth of the unfinished bale provides a force that pushes the finished bale toward the discharge outlet. An ejector system may also be used to eject the finished bale. The ejector system includes ejector teeth that can be manually selected to project into the forming chamber to engage the finished bale. In some balers, there may be a total of sixteen teeth, each spaced eighteen inches apart from the next. The ejector teeth are secured to a carriage that is moveable in both the forward direction (i.e., away from the discharge outlet) and the rearward direction (i.e., toward the discharge outlet) within the forming chamber by a hydraulic cylinder. One or more of the ejector teeth can be manually selected to remain retracted so that they do not engage the unfinished bale. The carriage may move rearwardly and forwardly several times while pulling the finished bale out, wherein the ejector teeth are projected to engage the finished bale when the carriage is moving rearwardly and retracted when the carriage is moving forwardly to reset for another pulling stroke.

When preparing to eject a bale, it is necessary to perform several operations in the proper sequence. The operator must exit the tractor and physically perform these steps, which may include manually placing a bale chute in a full-down position, manually decompressing the forming chamber, manually operating the PTO at sufficient speed to open the forming chamber to eject the bales, manually stopping the PTO, physically examining the forming chamber to determine which ejector teeth are needed to engage the finished bale but not the unfinished bale adjacent to it, manually selecting the corresponding ejector teeth, manually activating the hydraulic cylinder to move the carriage rearwardly, physically examining the discharge outlet to determine whether the bale has been ejected, and if it has not, repeatedly manually activating the hydraulic cylinder to move the carriage forwardly and then rearwardly until it has been ejected.

Requiring operators to exit their tractors to perform these steps can be both inconvenient and inefficient. Furthermore, substantial time and expense are required to train operators to perform this sequence of steps correctly. For example, operators must know and remember which of the tractor's hydraulic auxiliary ports are connected to which of the baler's components, and must activate the ports and the PTO in the correct sequence to correctly position multiple baler components for ejecting the bale. Untrained, inexperienced, or inattentive operators may make mistakes during the procedure, which can result in confusion, reduced efficiency, and possible damage to the tractor, the baler, or the finished bale. For example, an operator might forget the correct sequence of steps or execute the steps slowly, or the operator might select the wrong number of ejector teeth and thereby damage the finished bale or inadvertently eject all or part of the unfinished bale.

This background discussion is intended to provide information related to the present invention which is not necessarily prior art.

SUMMARY

Embodiments of the present invention solve the above-described and other problems and limitations by providing for the improved ejection of bales by a remote operator by substantially automating the ejection procedure based on input from various sensors and the remote operator, thereby avoiding the time required to properly train the operator in the more complex manual process, avoiding the inconvenience and inefficiency of requiring the operator to exit a tractor to physically inspect a baler and manually perform ejection procedure steps, and avoiding damage or injury that might result from performing the procedure incorrectly. The substantially automated procedure includes determining a finished bale's length and selecting the correct ejector teeth to engage the finished bale while not engaging an adjacent unfinished bale, thereby avoiding the inconvenience and inefficiency of requiring the operator to physically inspect the forming chamber and manually select the correct ejector teeth and avoiding the risks, if the operator fails to select the correct ejector teeth, of damage to the finished bale and inadvertent ejection of the unfinished bale.

An embodiment of the invention is a baling system for ejecting a bale from a baler using a substantially automatic ejection procedure with input from a remote operator located on a tractor. The baler includes a forming chamber containing the bale and having a discharge outlet, a chute located adjacent to the discharge outlet, and a plurality of ejector teeth operable to selectively retract from and project into the forming chamber. The baling system may comprise the following elements. An electronic control unit is operable to receive input signals and send control signals and thereby control the ejection procedure. A bale chute sensor is operable to provide a first input signal to the control unit regarding a position of the chute, wherein the control unit determines whether the chute is in a proper chute position, and if the chute is not in the proper chute position, the control unit sends a first control signal to cause the chute to move to the proper chute position. The control unit is further operable to send a second control signal to cause one or more of the ejector teeth to project into the forming chamber to engage the bale. The control unit is further operable to send a third control signal to cause the one or more of the ejector teeth to move from a back position toward the discharge outlet, wherein this movement of the one or more of the ejector teeth engaging the bale causes the bale to move toward and through the discharge outlet and through the chute. A drop sensor is operable to provide a second input signal to the control unit regarding whether the bale has been fully ejected from the chute, and if the bale has been fully ejected from the chute, the control unit sends a fourth control signal to cause the one or more of the ejector teeth to return to the back position and stop, and if the bale has not been fully ejected from the chute, the control unit sends the fourth control signal to return the one or more of the ejector teeth to the back position and then resends the third control signal.

In various implementations of this embodiment, the baling system may further include any one or more of the following additional features. The tractor may include a power take-off connected to the baler, and the baler may further include a chamber door operable to selectively cover the discharge outlet, and the system may further include a power take-off speed sensor operable to provide a third input signal to the control unit regarding a speed of the power take-off, wherein the control unit determines whether the power take-off speed is sufficient to release a pressure on the chamber door, and if the power take-off speed is not sufficient, the control unit sends a fifth control signal to the tractor to increase the power take-off speed, and when the power take-off speed is sufficient, the control unit sends a sixth control signal to release the pressure on and open the chamber door. The baling system may further include a chamber door position sensor operable to provide a fourth input signal to the control unit regarding a position of the chamber door, wherein the control unit determines whether the chamber door is in a proper door position, and if the chamber door is in the proper door position, the control unit sends a seventh control signal to stop the power take-off. The control unit may be further operable to receive a third input signal from the remote operator regarding whether to eject only the bale or to eject an entire contents of the forming chamber, and to select the one or more of the plurality of ejector teeth based on the third input signal. The baler may further include one or more bale length sensors located along an interior surface of the forming chamber and operable to provide a third input signal to the control unit regarding a length of the bale, and wherein the control unit is further operable to select the one or more of the plurality of ejector teeth to project into the forming chamber to engage the bale based on the length of the bale. The baler may further include a tying mechanism located at least partially in the forming chamber and operable to tie the bale prior to ejection, and the control unit is further operable to receive a third input signal from the remote operator regarding whether to tie the bale prior to ejection and to send a fifth control signal to activate the tying mechanism.

Additionally, each of these implementations and embodiments may be alternatively characterized as methods based on their functionalities.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 4 is a cross-sectional elevation view of the components of FIG. 2 engaged in a third stage of the bale-forming process;

FIG. 5 is a cross-sectional elevation view of the components of FIG. 2 engaged in a fourth stage of the bale-forming process in which a bale is ejected from the baler;

Figure 1:
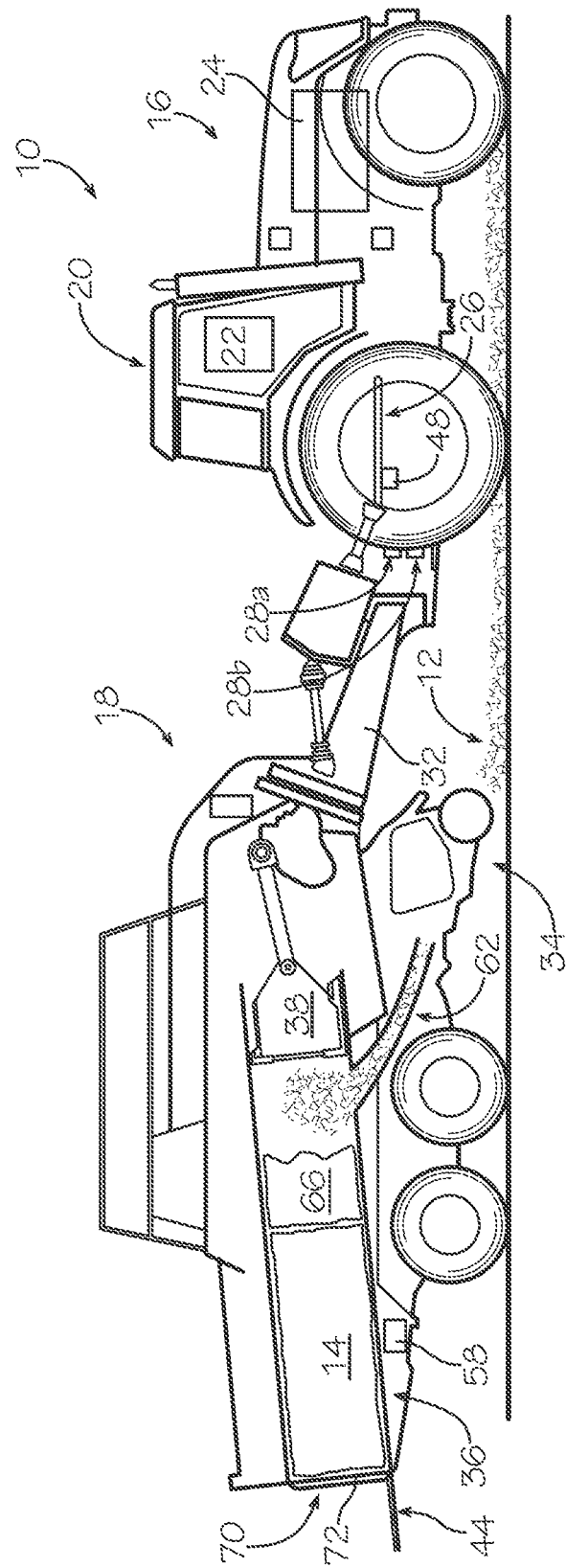
FIG. 1 is a cross-sectional elevation view of a baling system constructed in accordance with an embodiment of the present invention.
Figure 2:
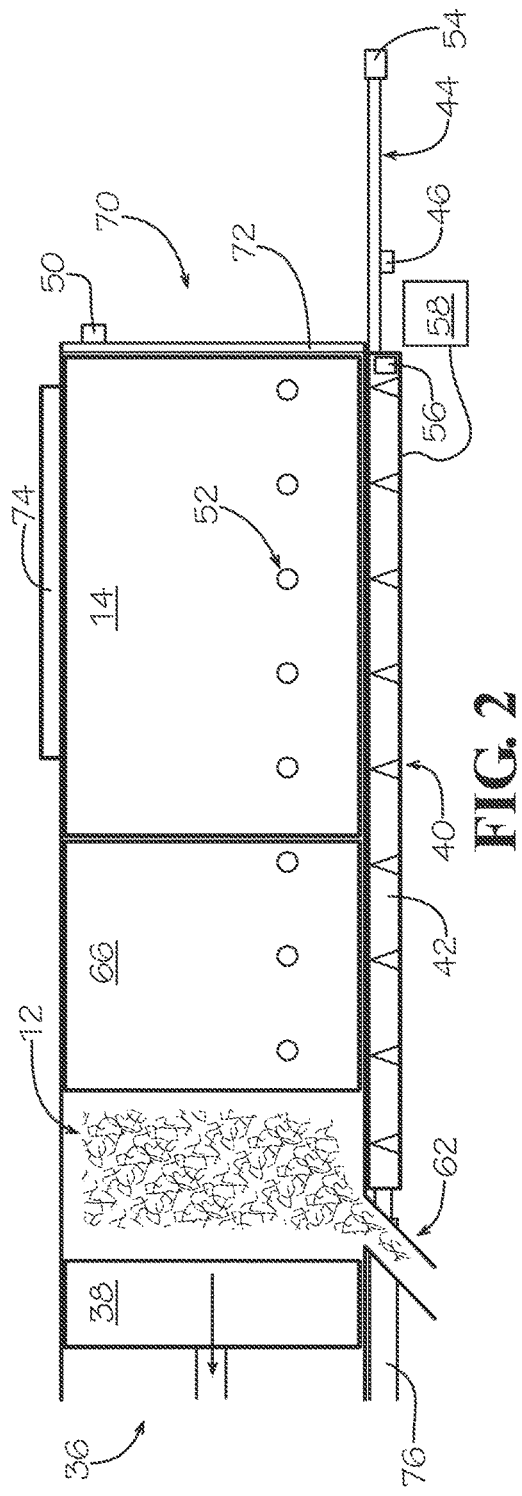
FIG. 2 is a cross-sectional elevation view of the baling system of FIG. 1 showing components engaged in a first stage of a bale-forming process.
Figure 3:
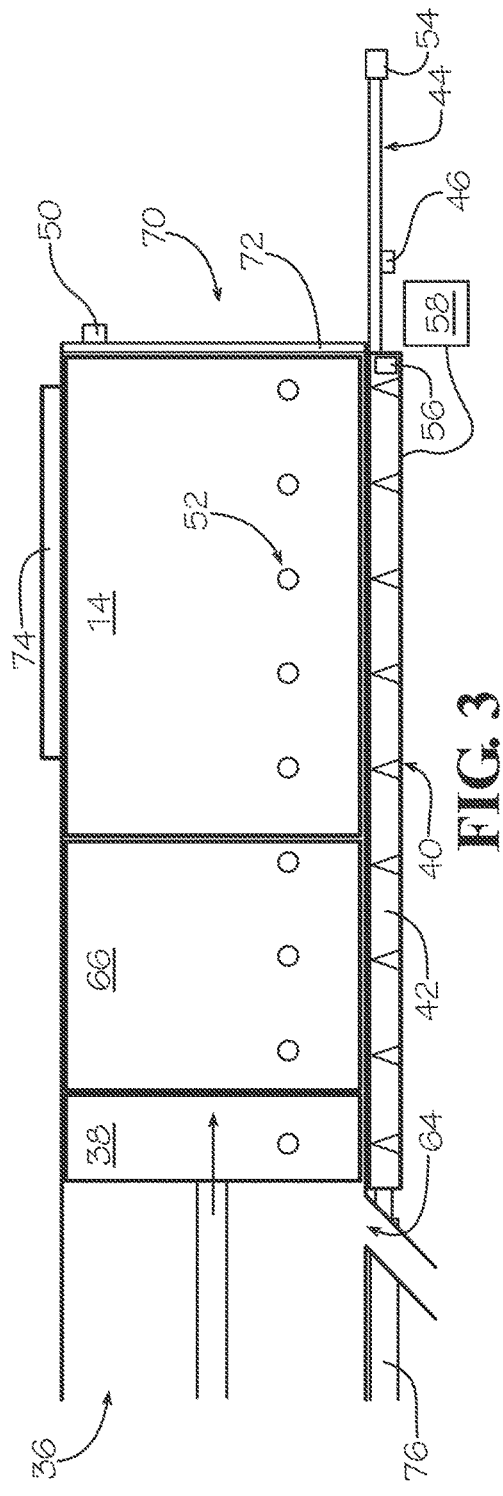
FIG. 3 is cross-sectional elevation view of the components of FIG. 2 engaged in a second stage of the bale-forming process.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides for the improved ejection of bales by a remote operator by substantially automating the ejection procedure based on input from various sensors and the remote operator, thereby avoiding the time required to properly train the operator in the more complex manual process, avoiding the inconvenience and inefficiency of requiring the operator to exit a tractor to physically inspect a baler and manually perform the ejection procedure steps, and avoiding damage or injury that might result from performing the procedure incorrectly. The substantially automated procedure includes determining a finished bale's length and selecting the correct ejector teeth to engage the finished bale while not engaging an adjacent unfinished bale, thereby avoiding the inconvenience and inefficiency of requiring the operator to physically inspect the forming chamber and manually select the correct ejector teeth and avoiding the risks, if the operator fails to select the correct ejector teeth, of damage to the finished bale and inadvertent ejection of the unfinished bale.

Referring to FIGS. 1-5, an embodiment of the baling system 10 is operable to receive loose crop material 12 and form it into a substantially rectangular finished bale 14. The baling system 10 may broadly comprise a tractor 16 and a baler 18. The tractor 16 may include a cab 20 wherein the remote operator of the baler 18 is located; an electronic display 22 located in the cab 20 and operable to display information to and receive input from the remote operator; an engine 24 operable to move the tractor 16; a PTO 26 operable to transfer mechanical power from the engine 24 to the baler 18 or other connected machinery; first and second hydraulic auxiliary ports 28a, 28b operable to transfer hydraulic power to the baler 18 or other connected machinery. The baler 18 may broadly comprise a frame 32 mechanically coupled with the tractor 16; a loose crop material receiving component 34; a forming chamber 36; a plunger 38; a plurality of ejector teeth 40; an ejector carriage 42; a bale chute 44; a bale chute position sensor 46; a PTO speed sensor 48; a chamber door sensor 50; one or more bale length sensors 52; a bale drop sensor 54; an ejection position sensor 56; and an electronic control unit (ECU) 58.

The loose crop material receiving component 34 may include an arbor component operable to pick up the loose crop material 12 from the ground, a cutter component operable to cut the collected loose crop material 12, and a feeder component operable to feed the loose crop material 12 into a stuffer chute 62 connected to the forming chamber 36.

The forming chamber 36 is operable to receive loose crop material 12 from the stuffer chute 62 via a stuffer chute inlet 64, and hold the loose crop material 12 as it is compressed into a growing unfinished bale 66 located adjacent to the finished bale 14. The forming chamber 36 may be substantially rectangular in shape to facilitate the compression and forming process. The forming chamber 36 may include a discharge outlet 70 through which the finished bale 14 is ejected, and a chamber door 72 which selectively covers the discharge outlet 70 and against which the loose crop material 12 is compressed during the formation of the bale 14.

The plunger 38 is operable to compress the loose crop material 12 into the unfinished bale 66 by moving within the forming chamber 36 in a reciprocating manner. More specifically, the plunger 38 repeatedly extends into the forming chamber 36 to compress the loose crop material already present therein, and retracts to allow additional loose crop material to enter via the stuffer chute inlet 64.

In one implementation, a tying mechanism 74 extends at least partially into the forming chamber 36 and is operable to tie the finished bale 14 prior to ejection from the forming chamber 36 so that it retains its substantially rectangular shape after ejection.

The plurality of ejector teeth 40 are each operable to selectively project into the forming chamber 36 to engage both the finished and the unfinished bales 14, 66 or to engage only the finished bale 14, and to selectively retract from the forming chamber 36 so as not to engage the finished and the unfinished bales 14, 66 or so as not to engage only the unfinished bale 66. The initial locations of the ejector teeth 40 may be fixed relative to the position of the bale 14 and preprogrammed into a non-volatile memory that is accessible by the ECU 58, or may be variable relative to the position of the bale 14 and determined by, e.g., one or more tooth-locating sensors.

The ejector carriage 42 is operable to support the ejector teeth 40 and to move forwardly and rearwardly within the forming chamber 36, wherein the ejector carriage 42 moves rearwardly to an eject position with one or more of the ejector teeth 42 projecting into the forming chamber 36 to pull the bale 14 toward the discharge outlet 70 for ejection, and moves forwardly to a rest or back position with all of the ejector teeth 40 retracted to reset before moving rearwardly again with the one or more of the ejector teeth 40 projecting. A hydraulic cylinder 76 coupled with the tractor's first hydraulic auxiliary port 28a may drive the movement of the ejector carriage 42.

The bale chute 44 may be located behind the discharge outlet 70 and operable to guide the ejecting bale 14 out of the forming chamber 36. The bale chute 44 may be selectively moveable between a down position during the ejection procedure and an up position for stowage, and this movement may be driven by a hydraulic mechanism coupled with the tractor's second hydraulic auxiliary port 28b.

The bale chute position sensor 46 may be located near or on the bale chute 44 and operable to determine or provide information to the ECU 58 for determining the position of the bale chute 44, including whether the bale chute 44 is in proper position to receive the bale 14. The PTO speed sensor 48 may be located near or on the PTO 26 and operable to determine or provide information to the ECU 58 for determining the speed of the PTO 26, including whether the PTO speed is sufficient to accomplish certain actions and whether the PTO 26 has stopped. The chamber door sensor 50 may be located near or on the chamber door 72 and operable to determine or provide information to the ECU 58 for determining the position of the chamber door 72 including whether the chamber door 72 is sufficiently open to eject the bale 14.

Figure 6:
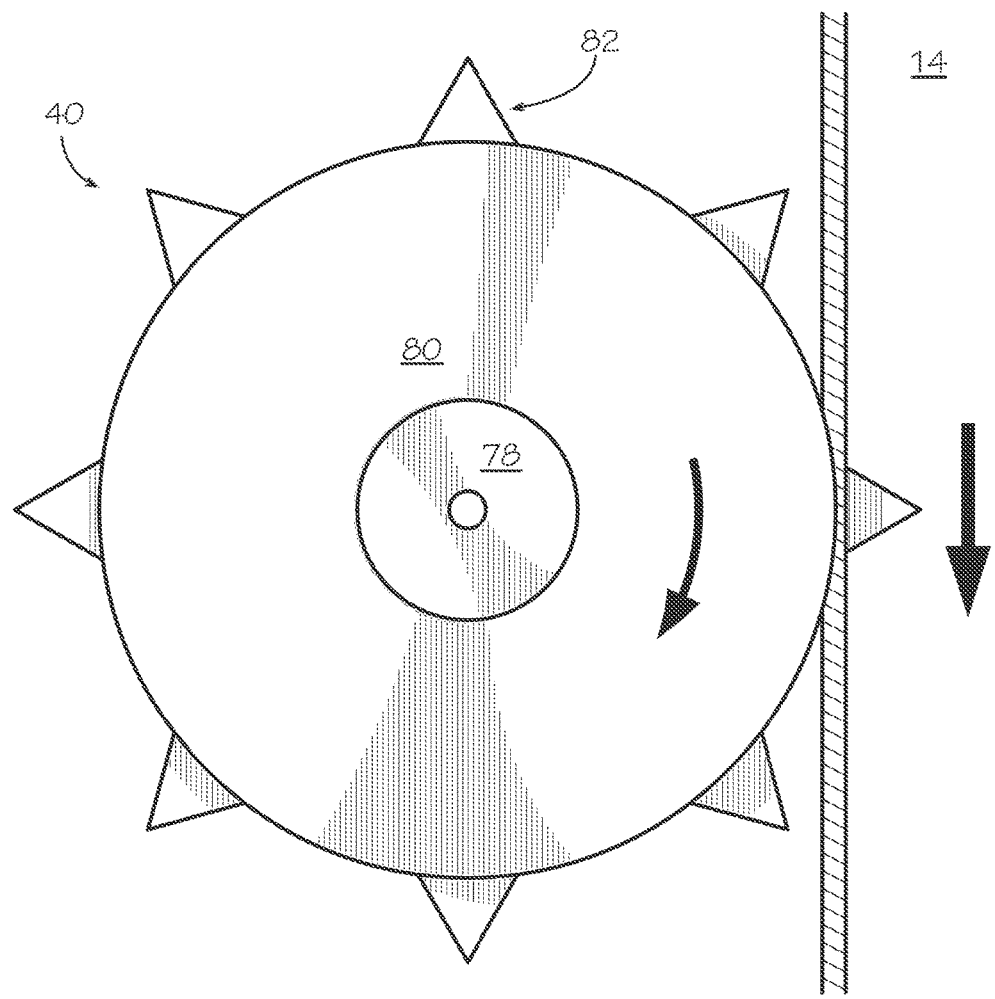
FIG. 6 is a cross-sectional plan view of an implementation of a bale length sensor component of the baling system of FIG. 2.

The one or more bale length sensors 52 are located along an interior surface of the forming chamber 36 and operable to determine or provide information to the ECU 58 for determining the length of the bale 14 and, in particular, to determine the position of a forward face of the bale 14, i.e., the face that is opposite the discharge outlet 70 and adjacent to the unfinished bale 66 and that therefore marks the end of the bale 14 and the approximate beginning of the unfinished bale 66. Referring to FIG. 6, in one implementation each sensor bale length sensor 40 may include an encoder 78 attached to a wheel 80 having multiple projections 82 around its periphery. The projections 82 engage the bale 14 and turn the wheel 80 as the bale 14 moves through the forming chamber 36, and the encoder 78 translates this turning motion into electronic signals that can be used to determine the position of the bale 14. The encoder 78 may be, for example, a quadrature encoder or an optical encoder having dual rotating discs and a photo receiver. If the encoder 78 is a quadrature encoder, then, for example, there may be 1000 pulses per one turn of the wheel 80. In this way, the length of the bale 14 is known, including where it starts and where it ends within the forming chamber 36. In one implementation, when the bale 14 is tied by the tying mechanism 74, the encoder 78 is reset to zero.

The bale drop sensor 54 may be located on or near the rear of the baler 18 and operable to determine or provide information to the ECU 58 for determining whether the ejecting bale 14 has fully exited the baler 18. The ejection position sensor 56 may be located on or near the ejector carriage 42 and operable to determining or provide information to the ECU 58 for determining the position of the ejector carriage 42.

The ECU 58 may be operable to receive input signals from the remote operator via the tractor's electronic display 22 and from the various sensors 46, 50, 52, 54, 56, and provide output signals to the electronic display 22 and various components of the bale ejection system 10 to substantially automatically control the bale ejection procedure. To that end, the electronic display 22 may be in bi-directional communication with the ECU 58, and a graphical user interface (GUI) may be presented on the electronic display 22 to facilitate providing output to and receiving input from the remote operator located in or on the tractor 16.

In operation, the baling system 10 may function as follows to eject the bale 14. Throughout this procedure, the operator of the tractor 16 is able to remain in or on the tractor 16 and is therefore considered a remote operator of the baler 18. The bale ejection procedure begins with the forming chamber 36 containing the finished bale 14, which is ready for ejection, and the adjacent unfinished bale 66, and the remote operator uses the GUI presented on the electronic display 22 to provide input to the ECU 58 to initiate ejecting the bale 14. The remote operator may also choose whether to tie the bale 14 prior to its ejection. Upon receipt of the initiation signal, the ECU 58 checks the bale chute position sensor 46 to determine whether the bale chute 44 is in the proper down position to receive the bale 14, as shown in step 100. If the bale chute sensor 46 indicates that the bale chute 44 is not in the proper down position, then the ECU 58 sends a signal to the tractor 16 to activate the second hydraulic auxiliary port 28b to move the bale chute 44 into the proper down position, shown in step 102. Once the bale chute position sensor 46 indicates that the bale chute 44 is in the down position, the ECU 58 sends a signal to the tractor 16 to deactivate the second hydraulic auxiliary port 28b and thereby halt the movement of the bale chute 44. If the remote operator selected that the bale 14 be tied, then the ECU 58 sends a signal to the tying mechanism 74 to tie the bale 14, as shown in step 104.

In one implementation, the ECU 58 sends a signal to the tractor 16 to control the PTO speed for opening the forming chamber 36. More specifically, the ECU 58 checks the PTO speed sensor 48 to determine whether the PTO speed is sufficient to release the pressure on the chamber door 72, as shown in step 106. If the PTO speed is not sufficient, the ECU 58 sends a signal to the tractor 16 to set the PTO speed at a sufficient level, as shown in step 108. When the PTO speed is sufficient, the ECU 58 sends a signal to release the pressure on and open the chamber door 72, as shown in step 110. The ECU 58 checks the chamber door sensor 50 to determine whether the chamber door 72 is sufficiently open, as shown in step 112. If the chamber door is 72 not sufficiently open, the ECU 58 sends a signal to continue opening the door chamber 72, as shown in step 114. Once the chamber door 72 is sufficiently open, the ECU 58 sends a signal to the tractor 16 to stop the PTO 26. In a second implementation, the ECU 58 does not control the PTO speed, but rather proceeds to the next step in the procedure.

Figure 8:
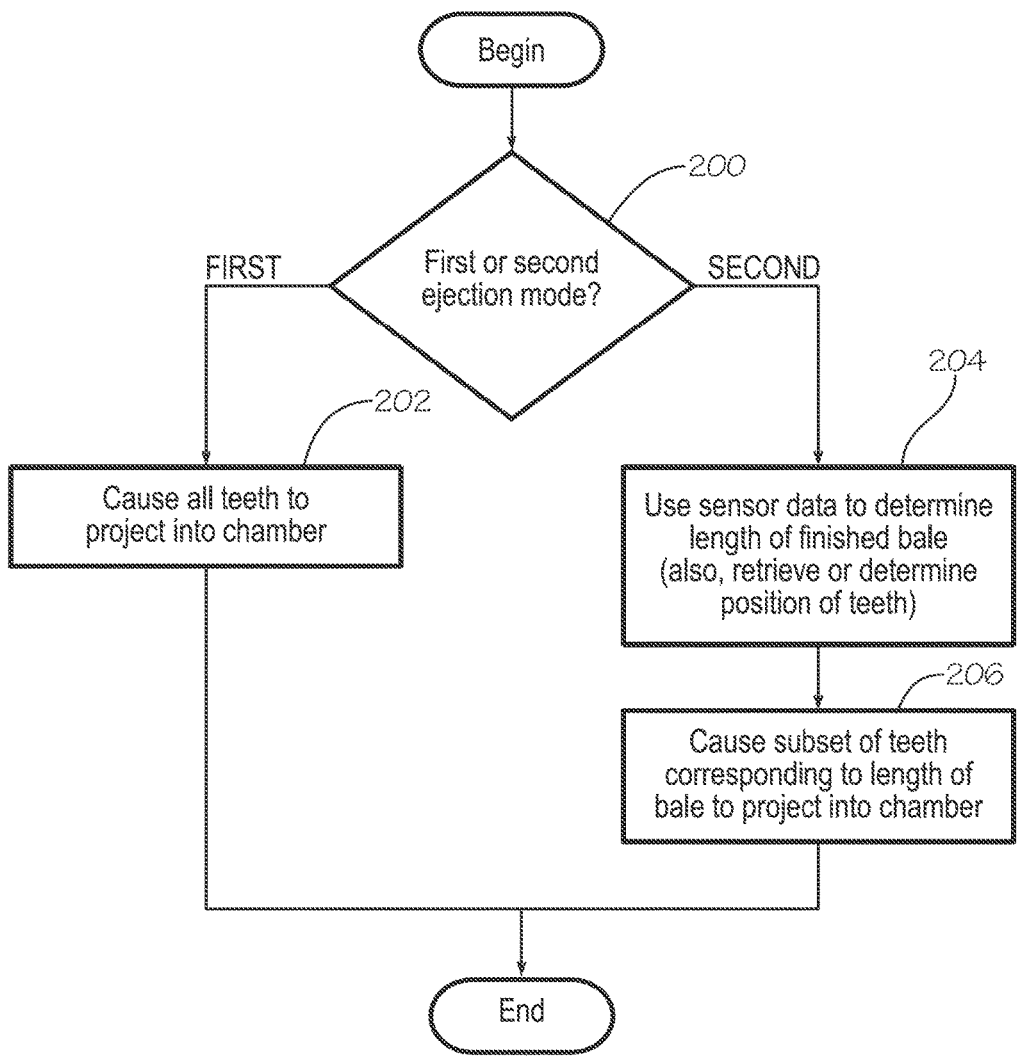
FIG. 8 is a flow diagram of substeps included in one of the steps of FIG. 7.

At this stage, all of the ejector teeth 40 are in their retracted states. The ECU 58 causes one or more of the plurality of ejector teeth 40 to project into the forming chamber 36, as shown in step 116. Referring also to FIG. 8 which shows this process in more detail, the remote operator provides input to the ECU 58 regarding a preferred ejection mode: A first mode in which all of the contents of the forming chamber 36 are ejected or a second mode in which only the finished bale 14 nearest to the discharge outlet 70 is ejected, as shown in step 200. If the remote operator selects the first mode, then the ECU 58 sends a control signal to cause all of the ejector teeth 40 to project into the forming chamber 36 so as to engage all of its contents, as shown in step 202. If the remote operator selects the second mode, the ECU 58 uses data provide by the bale length sensors 52 to determine which subset of the ejector teeth 40 correspond to the position of the finished bale 14, as shown in step 204, and sends a signal to cause only those ejector teeth 40 to project into the forming chamber 36 and engage only the finished bale 14, as shown in step 206 (and also illustrated in FIG. 4).

Figure 7:
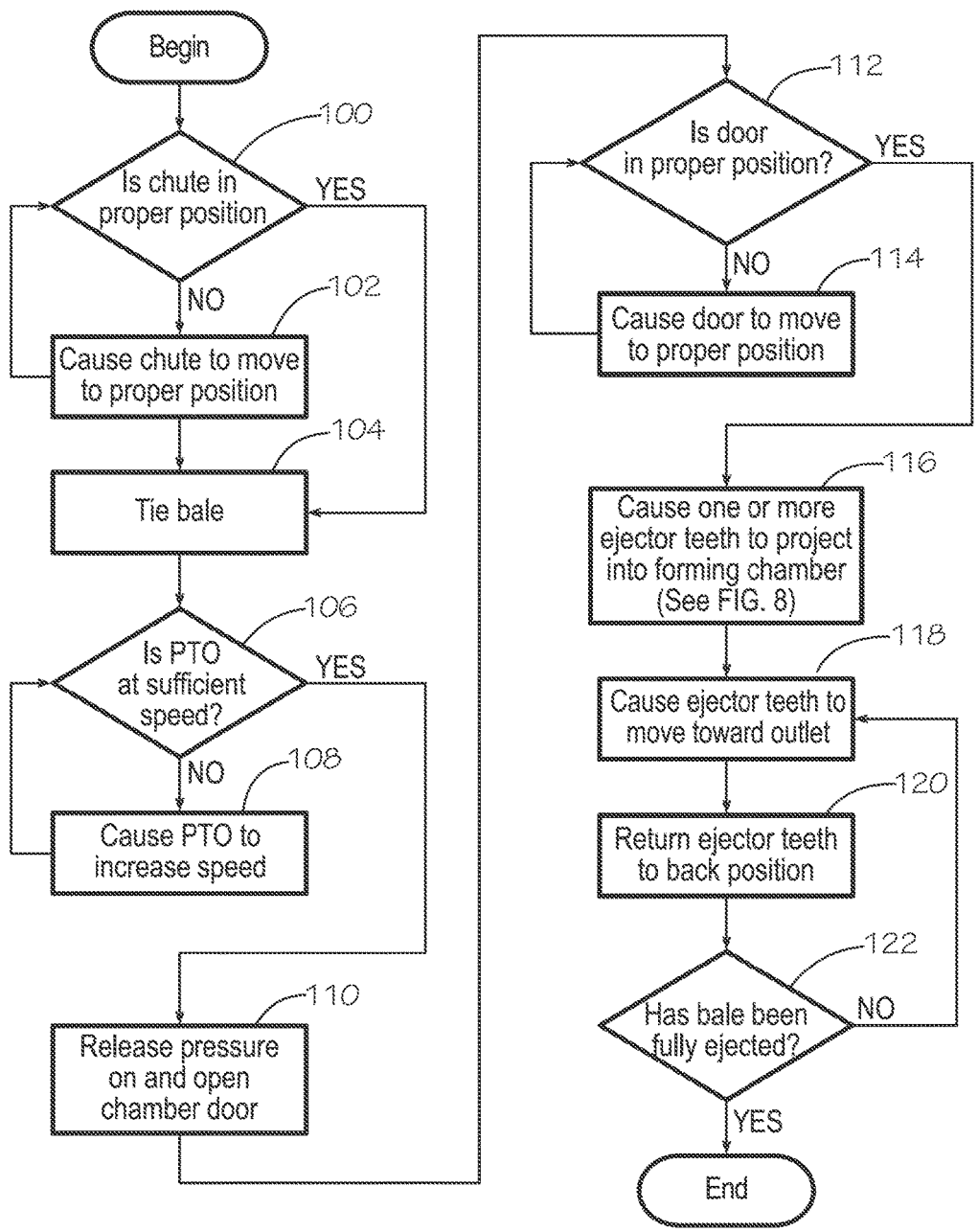
FIG. 7 is a flow diagram of method steps performed by the baling system of FIG. 1 in ejecting the bale.

Referring again to FIG. 7, the ECU 58 sends a signal to the tractor 16 to activate the first hydraulic auxiliary port 28a to cause the hydraulic cylinder 76 to extend the ejection carriage 42, as shown in step 118. As the ejector carriage 42 extends, the ejector teeth 40 pull the bale 14 toward and through the discharge outlet 70 and onto the bale chute 44. When the ejector carriage 42 reaches its fully extended position, the ECU 58 sends a signal to cause the ejector teeth 40 to retract, and then sends a signal to the tractor 16 to activate the first hydraulic auxiliary port 28a to retract the ejector carriage 42 to its back position, as shown in step 120. The ECU 58 checks the bale drop sensor 54 to determine when the bale 14 has fully exited the baler 18, as shown in step 122, and, if it has not, the ECU 58 causes the ejector teeth 40 to again project into the forming chamber 36 and returns to step 118. When the ECU 58 determines that the bale 14 has been fully ejected, and when the ejector position sensor 56 indicates that the ejector carriage 42 is at the fully retracted position, the ECU 58 sends a signal to the tractor 16 to deactivate the first hydraulic auxiliary port 28a.

Throughout the ejection procedure, the ECU 58 may set time limits for receiving expected sensor inputs which trigger the next step in the sequence. If an expected sensor input is not received within the given time limit for that sensor, then the ECU 58 may communicate a warning signal to the tractor's electronic display 22 and may exit the procedure. The ECU 58 may pause at one or more points in the procedure and wait for input from the remote operator via the electronic display 22 before proceeding to the next step in the sequence.

Thus, the present invention provides advantages over the prior art, including that it provides for the improved ejection of bales by the remote operator by substantially automating the ejection procedure based on input from sensors and the remote operator, thereby avoiding the time required to properly train the operator in the more complex manual process, avoiding the inconvenience and inefficiency of requiring the operator to exit a tractor to physically inspect a baler and manually perform ejection procedure steps, and avoiding damage or injury that might result from performing the procedure incorrectly. The substantially automated procedure includes determining a finished bale's length and selecting the correct ejector teeth to engage the finished bale while not engaging an adjacent unfinished bale, thereby avoiding the inconvenience and inefficiency of requiring the operator to physically inspect the forming chamber and manually select the correct ejector teeth and avoiding the risks, if the operator fails to select the correct ejector teeth, of damage to the finished bale and inadvertent ejection of the unfinished bale.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for ejecting a bale from a baler using an automatic ejection procedure with input from a remote operator located on a tractor, wherein the baler includes a forming chamber containing the bale and having a discharge outlet, a chute located adjacent to the discharge outlet, and a plurality of ejector teeth configured to selectively retract from and project into the forming chamber, the system comprising:

an electronic control unit configured to receive input signals and send control signals and thereby control the substantially automatic ejection procedure;

a bale chute sensor configured to provide a first input signal to the electronic control unit regarding a position of the chute, wherein the electronic control unit is configured to determine whether the chute is in a proper chute position, and if the chute is not in the proper chute position, the electronic control unit is configured to send a first control signal to cause the chute to move to the proper chute position;

the electronic control unit is further configured to send a second control signal to cause one or more of the plurality of ejector teeth to project into the forming chamber to engage the bale, the electronic control unit is further configured to send a third control signal to cause the one or more of the plurality of ejector teeth to move from a back position toward the discharge outlet, wherein this movement of the one or more of the plurality of ejector teeth engaging the bale causes the bale to move toward and through the discharge outlet and through the chute; and a drop sensor configured to provide a second input signal to the electronic control unit regarding whether the bale has been fully ejected from the chute, and if the bale has been fully ejected from the chute, the electronic control unit is configured to send a fourth control signal to cause the one or more of the plurality of ejector teeth to return to the back position and stop, and if the bale has not been fully ejected from the chute, the electronic control unit is configured to send the fourth control signal to return the one or more of the plurality of ejector teeth to the back position and then resends the third control signal.

2. The system as set forth in claim 1, wherein the tractor includes a power take-off connected to the baler, and the baler further includes a chamber door operable to selectively cover the discharge outlet, and the system further includes a power take-off speed sensor operable to provide a third input signal to the electronic control unit regarding a speed of the power take-off, wherein the electronic control unit determines whether the power take-off speed is sufficient to release a pressure on the chamber door, and if the power take-off speed is not sufficient, the electronic control unit sends a fifth control signal to the tractor to increase the power take-off speed, and when the power take-off speed is sufficient, the electronic control unit sends a sixth control signal to release the pressure on and open the chamber door.

3. The system as set forth in claim 2, the system further including a chamber door position sensor operable to provide a fourth input signal to the electronic control unit regarding a position of the chamber door, wherein the electronic control unit determines whether the chamber door is in a proper door position, and if the chamber door is in the proper door position, the electronic control unit sends a seventh control signal to stop the power take-off.

4. The system as set forth in claim 1, the electronic control unit being further operable to receive a third input signal from the remote operator regarding whether to eject only the bale or to eject an entire contents of the forming chamber, and to select the one or more of the plurality of ejector teeth based on the third input signal.

5. The system as set forth in claim 1, wherein the baler further includes one or more bale length sensors located along an interior surface of the forming chamber and operable to provide a third input signal to the electronic control unit regarding a length of the bale, and wherein the electronic control unit is further operable to select the one or more of the plurality of ejector teeth to project into the forming chamber to engage the bale based on the length of the bale.

6. The system as set forth in claim 1, wherein the baler further includes a tying mechanism located at least partially in the forming chamber and operable to tie the bale prior to ejection from the forming chamber, and wherein the electronic control unit is further operable to receive a third input signal from the remote operator regarding whether to tie the bale prior to ejection and to send a fifth control signal to activate the tying mechanism.

7. A system for ejecting a bale from a baler using an automatic ejection procedure with input from a remote operator located on a tractor, wherein the tractor includes a power take-off connected to the baler, and wherein the baler includes a forming chamber containing the bale and having a discharge outlet, a chute located adjacent to the discharge outlet, a chamber door configured to selectively cover the discharge outlet, and a plurality of ejector teeth configured to selectively retract from and project into the forming chamber, the system comprising:

an electronic control unit configured to receive input signals and send control signals and thereby control the automatic ejection procedure; a bale chute sensor configured to provide a first input signal to the electronic control unit regarding a position of the chute, wherein the electronic control unit is configured to determine whether the chute is in a proper chute position, and if the chute is not in the proper chute position, the electronic control unit sends a first control signal to cause the chute to move to the proper chute position;

a power take-off speed sensor configured to provide a second input signal to the electronic control unit regarding a speed of the power take-off, wherein the electronic control unit is configured to determine whether the power take-off speed is sufficient to release a pressure on the chamber door, and if the power take-off speed is not sufficient, the electronic control unit sends a second control signal to the tractor to increase the power take-off speed, and when the power take-off speed is sufficient, the electronic control unit sends a third control signal to release the pressure on and open the chamber door;

a chamber door position sensor configured to provide a third input signal to the electronic control unit regarding a position of the chamber door, wherein the electronic control unit is configured to determine whether the chamber door is in a proper door position, and if the chamber door is in the proper door position, the electronic control unit sends a fourth control signal to stop the power take-off, the electronic control unit is further configured to receive a fourth input signal from the remote operator regarding whether to eject only the bale or to eject an entire contents of the forming chamber, and to select one or more of the plurality of ejector teeth based on the fourth input signal, and to send a fifth control signal to cause the one or more of the plurality of ejector teeth to project into the forming chamber to engage the bale;

the electronic control unit is further configured to send a sixth control signal to cause the one or more of the plurality of ejector teeth to move from a back position toward the discharge outlet, wherein this movement of the one or more of the plurality of ejector teeth engaging the bale causes the bale to move toward and through the discharge outlet and through the chute; and a drop sensor configured to provide a fifth input signal to the electronic control unit regarding whether the bale has been fully ejected from the chute, and if the bale has been fully ejected from the chute, the electronic control unit is configured to send a seventh control signal to cause the one or more of the plurality of ejector teeth to return to the back position and stop, and if the bale has not been fully ejected from the chute, the electronic control unit is configured to send the seventh control signal to return the one or more of the plurality of ejector teeth to the back position and then resends the sixth control signal.

8. The system as set forth in claim 7, wherein the baler further includes a tying mechanism located at least partially in the forming chamber and operable to tie the bale prior to ejection from the forming chamber, and wherein the electronic control unit is further operable to receive a sixth input signal from the remote operator regarding whether to tie the bale prior to ejection, and to send an eighth control signal to activate the tying mechanism.

9. The system as set forth in claim 7, wherein the baler further includes one or more bale length sensors located along an interior surface of the forming chamber and operable to provide a sixth input signal to the electronic control unit regarding a length of the bale, and wherein the electronic control unit is further operable to select the one or more of the plurality of ejector teeth to project into the forming chamber to engage the bale based on the length of the bale.

10. A method of automatically ejecting a bale from a baler using an ejection procedure controlled by an electronic control unit with input from a remote operator located on a tractor, wherein the baler includes a forming chamber containing the bale and having a discharge outlet, a chute located adjacent to the discharge outlet, and a plurality of ejector teeth operable to selectively retract from and project into the forming chamber, the method comprising the steps of:

(1) receiving at the electronic control unit a first input signal regarding a position of the chute, determining by the electronic control unit whether the chute is in a proper chute position, and if the chute is not in the proper chute position, sending from the electronic control unit a first control signal to cause the chute to move to the proper chute position;

(2) selecting by the electronic control unit one or more of the plurality of ejector teeth, and sending from the electronic control unit a second control signal to cause the one or more of the plurality of ejector teeth to project into the forming chamber to engage the bale;

(3) sending from the electronic control unit a third control signal to cause the one or more of the plurality of ejector teeth to move from a back position toward the discharge outlet, wherein this movement of the one or more of the plurality of ejector teeth engaging the bale causes the bale to move toward and through the discharge outlet and through the chute; and (4) receiving a second input signal at the electronic control unit regarding whether the bale has been fully ejected from the chute, and if the bale has not been fully ejected from the chute, sending a fourth control signal from the electronic control unit to return the one or more of the plurality of ejector teeth to the back position and then repeat step (3), and if the bale has been fully ejected from the chute, sending from the electronic control unit a fifth control signal to cause the one or more of the plurality of ejector teeth to return to the back position and stop.

11. The method as set forth in claim 10, wherein the tractor includes a power take-off connected to the baler, and the baler further includes a chamber door operable to selectively cover the discharge outlet, and the method further including between steps (1) and (2) the step of receiving at the electronic control unit a third input signal regarding a power take-off speed, determining by the electronic control unit whether the power take-off speed is sufficient to release a pressure on a chamber door, if the power take-off speed is not sufficient, sending from the electronic control unit a sixth control signal to the tractor to increase the power take-off speed, and when the power take-off speed is sufficient, sending from the electronic control unit a seventh control signal to release the pressure on and open the chamber door.

12. The method as set forth in claim 11, further including the step of receiving at the electronic control unit a fourth input signal regarding a position of the chamber door, determining by the electronic control unit whether the chamber door is in a proper door position, and if the chamber door is in the proper door position, sending from the electronic control unit an eighth control signal to stop the power take-off.

13. The method as set forth in claim 10, wherein step (3) includes receiving at the electronic control unit a third input signal from the remote operator regarding whether to eject only the bale or to eject an entire contents of the forming chamber, and selecting by the electronic control unit the one or more of the plurality of ejector teeth based on the third input signal.

14. The method as set forth in claim 10, wherein the first control signal sent by the electronic control unit to cause the chute to move into position includes causing a hydraulic auxiliary port located on the tractor to activate and thereby hydraulically move the chute into the position.

15. The method as set forth in claim 10, further including the step of receiving at the electronic control unit a third input signal from the remote operator, and sending from the electronic control unit a sixth control signal to cause a tying mechanism located at least partial within the forming chamber to tie the bale.

16. The method as set forth in claim 10, wherein the third control signal sent by the electronic control unit to cause the one or more of the plurality of ejector teeth to move toward the chute includes causing a hydraulic auxiliary port located on the tractor to activate and thereby hydraulically move the one or more of the plurality of ejector teeth toward the chute.

17. The method as set forth in claim 10, further including the step of determining by the electronic control unit a time required to receive each of the input signals, and if one of the input signals is not received within a predetermined time period for that input signal, communicating a warning by the electronic control unit to the remote operator.

18. The method as set forth in claim 17, further including the step of if one of the input signals is not received within the predetermined time period for that input signal, sending a sixth control signal from the electronic control unit to stop the ejection procedure.

19. A method of automatically ejecting a bale from a baler using an ejection procedure controlled by an electronic control unit with input from a remote operator located on a tractor, wherein the tractor includes a power take-off connected to the baler, and wherein the baler includes a forming chamber containing the bale and having a discharge outlet, a chute located adjacent to the discharge outlet, a chamber door operable to selectively cover the discharge outlet, and a plurality of ejector teeth operable to selectively retract from and project into the forming chamber, the method comprising the steps of:

(1) receiving at the electronic control unit a first input signal regarding a position of the chute, determining by the electronic control unit whether the chute is in a proper chute position, and if the chute is not in the proper chute position, sending from the electronic control unit a first control signal to cause the chute to move to the proper chute position;

(3) receiving at the electronic control unit a second input signal regarding a power take-off speed, determining by the electronic control unit whether the power take-off speed is sufficient to release a pressure on a chamber door, if the power take-off speed is not sufficient, sending from the electronic control unit a second control signal to the tractor to increase the power take-off speed, and when the power take-off speed is sufficient, sending from the electronic control unit a third control signal to release the pressure on and open the chamber door;

(4) receiving at the electronic control unit a third input signal regarding a position of the chamber door, determining by the electronic control unit whether the chamber door is in a proper door position, and if the chamber door is in the proper door position, sending from the electronic control unit a fourth control signal to stop the power take-off;

(5) receiving at the electronic control unit a fourth input signal from the remote operator regarding whether to eject only the bale or to eject an entire contents of the forming chamber, selecting by the electronic control unit one or more of the plurality of ejector teeth based on the fourth input signal, and sending from the electronic control unit a fifth control signal to cause the one or more of the plurality of ejector teeth to project into the forming chamber to engage the bale;

(6) sending from the electronic control unit a sixth control signal to cause the one or more of the plurality of ejector teeth to move from a back position toward the discharge outlet, wherein this movement of the one or more of the plurality of ejector teeth engaging the bale causes the bale to move toward and through the discharge outlet and through the chute; and (7) receiving a fifth input signal at the electronic control unit regarding whether the bale has been fully ejected from the chute, and if the bale has not been fully ejected from the chute, sending a seventh control signal from the electronic control unit to return the one or more of the plurality of ejector teeth to the back position and then repeat step (6), and if the bale has been fully ejected from the chute, sending from the electronic control unit an eighth control signal to cause the one or more of the plurality of ejector teeth to return to the back position and stop.

20. The method as set forth in claim 19, further including the step of receiving at the electronic control unit a sixth input signal from the remote operator regarding whether to tie the bale prior to ejection, and sending from the electronic control unit a ninth control signal to cause a tying mechanism located at least partial within the forming chamber to tie the bale.

\* \* \* \* \*